United States Patent
Wang

(10) Patent No.: US 9,497,237 B2
(45) Date of Patent: Nov. 15, 2016

(54) DIGITAL SIGNAGE PLAYBACK SYSTEM, MONITORING SYSTEM, AND MONITORING METHOD THEREOF

(71) Applicant: Wistron Corporation, New Taipei (TW)

(72) Inventor: Chun-Wei Wang, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 192 days.

(21) Appl. No.: 14/107,405

(22) Filed: Dec. 16, 2013

(65) Prior Publication Data
US 2014/0244787 A1 Aug. 28, 2014

(30) Foreign Application Priority Data

Feb. 23, 2013 (TW) .............................. 102106392 A

(51) Int. Cl.
G06F 15/16 (2006.01)
H04L 29/06 (2006.01)

(52) U.S. Cl.
CPC ......... *H04L 65/4084* (2013.01); *H04L 65/601* (2013.01); *H04L 65/602* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 9,116,340 B2 * | 8/2015 | Jacobsen | G02B 27/017 |
| 2006/0069797 A1 * | 3/2006 | Abdo | H04L 65/4084 |
| | | | 709/231 |
| 2008/0005236 A1 * | 1/2008 | Schmieder | H04L 65/4084 |
| | | | 709/204 |
| 2010/0131659 A1 * | 5/2010 | Narayana | H04L 65/1083 |
| | | | 709/228 |
| 2010/0332589 A1 * | 12/2010 | Schwimer | G06F 17/30902 |
| | | | 709/203 |
| 2011/0032982 A1 * | 2/2011 | Costa | H04N 19/172 |
| | | | 375/240.02 |
| 2011/0150433 A1 * | 6/2011 | Alexandrov | H04N 5/91 |
| | | | 386/328 |
| 2011/0219419 A1 | 9/2011 | Reisman | |
| 2013/0036235 A1 * | 2/2013 | Lopez Garcia | H04L 65/602 |
| | | | 709/231 |
| 2013/0243076 A1 * | 9/2013 | Malladi | H04N 19/30 |
| | | | 375/240.01 |

FOREIGN PATENT DOCUMENTS

| | | |
|---|---|---|
| CN | 101795240 A | 8/2010 |
| CN | 102474624 A | 5/2012 |
| CN | 102771119 A | 11/2012 |

OTHER PUBLICATIONS

Office Action mailed Sep. 5, 2016 in corresponding CN Application No. 20130074754.7, and English translation of pp. 3-5 thereof (12 pages total).

* cited by examiner

Primary Examiner — Thomas Dailey
(74) Attorney, Agent, or Firm — Muncy, Geissler, Olds & Lowe, P.C.

(57) ABSTRACT

A digital signage playback system, a monitoring system, and a monitoring method thereof are disclosed. The digital signage playback system is used for providing a digital signage to display at a user side, wherein the digital signage includes a dynamic video file and a static image file. The digital signage playback system includes an image converter, a transport, and a video streaming converter. The image converter is used for analyzing the digital signage to convert the static image file into a compressed image file and transmit to a monitoring side via the transport. The video streaming converter is used for converting the dynamic video file into a streaming video file to the monitoring side so as to displaying the compressed image file and the streaming video file at the monitoring side.

17 Claims, 4 Drawing Sheets

DIGITAL SIGNAGE PLAYBACK SYSTEM, MONITORING SYSTEM, AND MONITORING METHOD THEREOF

BACKGROUND OF THE INVENTION

1. Field of the Invention

The present invention relates to a digital signage playback system, a monitoring system, and a monitoring method thereof; more particularly, the present invention relates to a digital signage playback system, a monitoring system, and a monitoring method thereof capable of monitoring playback content of a digital signage in real time.

2. Description of the Related Art

With the advent of modern technology, digital signage has been widely applied in our daily lives, wherein users can obtain information from the digital signage. The digital signage can provide information such as videos, images, and texts at the same time. Because the modern network environment architecture has improved day by day, the playback of the digital signage has also been gradually changed, from outputting through a computer host associated with a monitor, to transmitting signals directly via a network and playing back the signals directly on a monitor through a comparatively low-price set-top-box. After the set-top-box receives a playbill from the network, the set-top-box can utilize push technology to reconstruct the playback content, lay-out, and schedule so as to play back on the monitor. The above method can lower the playback cost of the digital signage; however, in the above prior art method, the set-top-box can only perform one-way playback without providing a feedback mechanism; which means an administrator cannot be aware of the playback content from a control side only if the administrator watches the playback content in front of the monitor.

Therefore, in order to achieve a feedback mechanism, in known prior arts, the set-top-box has to return a displayed desktop to the control side on a real time basis. However, the digital signage usually contains both images and videos which might cause transmission problems. The images can be transmitted via such as a remote desktop protocol (RDP). For example, RDP can rapidly capture the displayed desktop and transmit it to a remote control side, therefore such method can provide fast and good-quality effect for the transmission of static images; however, for the transmission of dynamic videos, RDP has to keep updating the playback content, and thus intensively increasing the file transmission loading.

On the other hand, the known prior art has already been applied with video streaming service technology. The video streaming service can save the downloaded portion of the video into a buffer, and simultaneously read contents saved in the buffer for playback, so as to avoid the inconvenience of playing back the video after finishing downloading the entire video. However, if the entire desktop of the digital signage are treated as continuous videos and thus played back via the video streaming service, the fixed or static images or texts of the digital signage would cause waste of bandwidth.

Therefore, there is a need to provide a digital signage playback system, a monitoring system and a monitoring method thereof to mitigate and/or obviate the aforementioned problems.

SUMMARY OF THE INVENTION

It is an object of the present invention to provide a digital signage playback system, which is capable of monitoring playback content of a digital signage in real time.

It is another object of the present invention to provide a monitoring system having the above digital signage playback system.

It is yet another object of the present invention to provide a monitoring method used in the above system.

To achieve the abovementioned objects, the digital signage playback system of the present invention is used for providing a digital signage to display at a user side, and allowing a monitoring side to monitor the digital signage, wherein the digital signage comprises a dynamic video file and a static image file. The digital signage playback system comprises a processor, an output module digital signage output end, a memory, a conversion module image converter, a transport, and a video streaming conversion module converter. The processor is used for generating the digital signage. The output module digital signage output end is electrically connected to the processor, and is used for outputting the digital signage to the user side. The memory is electrically connected to the processor, and therefore when the output module digital signage output end outputs the digital signage to the user side, the processor stores the digital signage into the memory at the same time. The conversion module image converter is electrically connected to the memory, and is used for reading from the memory and analyzing the digital signage, so as to convert the static image file into an compressed image file. The transport is electrically connected to the conversion module image converter, and is used for transmitting the compressed image file to the monitoring side. The video streaming conversion module converter is electrically connected to the conversion module image converter, and is used for converting the dynamic video file into a streaming video file for being transmitted to the monitoring side, such that the monitoring side can synchronously display the compressed image file and the streaming video file, so as to monitor the digital signage.

The monitoring system of the present invention comprises a user side, a monitoring side and a digital signage playback system. The digital signage playback system is connected to both the user side and the monitoring side, and is used for providing a digital signage to display on the user side, as well as allowing the monitoring side to monitor the digital signage, wherein the digital signage comprises a dynamic video file and a static image file. The digital signage playback system comprises a processor, an output module digital signage output end, a memory, a conversion module image converter, a transport, and a video streaming conversion module converter. The processor is used for generating the digital signage. The output module digital signage output end is electrically connected to the processor, and is used for outputting the digital signage to the user side. The memory is electrically connected to the processor, and therefore when the output module digital signage output end outputs the digital signage to the user side, the processor stores the digital signage into the memory at the same time. The conversion module image converter is electrically connected to the memory, and is used for reading from the memory and analyzing the digital signage, so as to convert the static image file into an compressed image file. The transport is electrically connected to the conversion module image converter, and is used for transmitting the compressed image file to the monitoring side. The video streaming conversion module converter is electrically connected to the conversion module image converter, and is used for converting the dynamic video file into a streaming video file for being transmitted to the monitoring side, such that the monitoring side can synchronously display the compressed image file and the streaming video file, so as to monitor the digital signage.

The monitoring method of the present invention comprises the following steps: generating a digital signage for being outputted to a user side; outputting the digital signage to the user side and simultaneously storing the digital signage; reading and analyzing the digital signage, so as to convert a static image file into an compressed image file; converting a dynamic video file into a streaming video file; and transmitting the compressed image file and the streaming video file to a monitoring side, such that the monitoring side can synchronously display the compressed image file and the streaming video file, so as to monitor the digital signage.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 1:
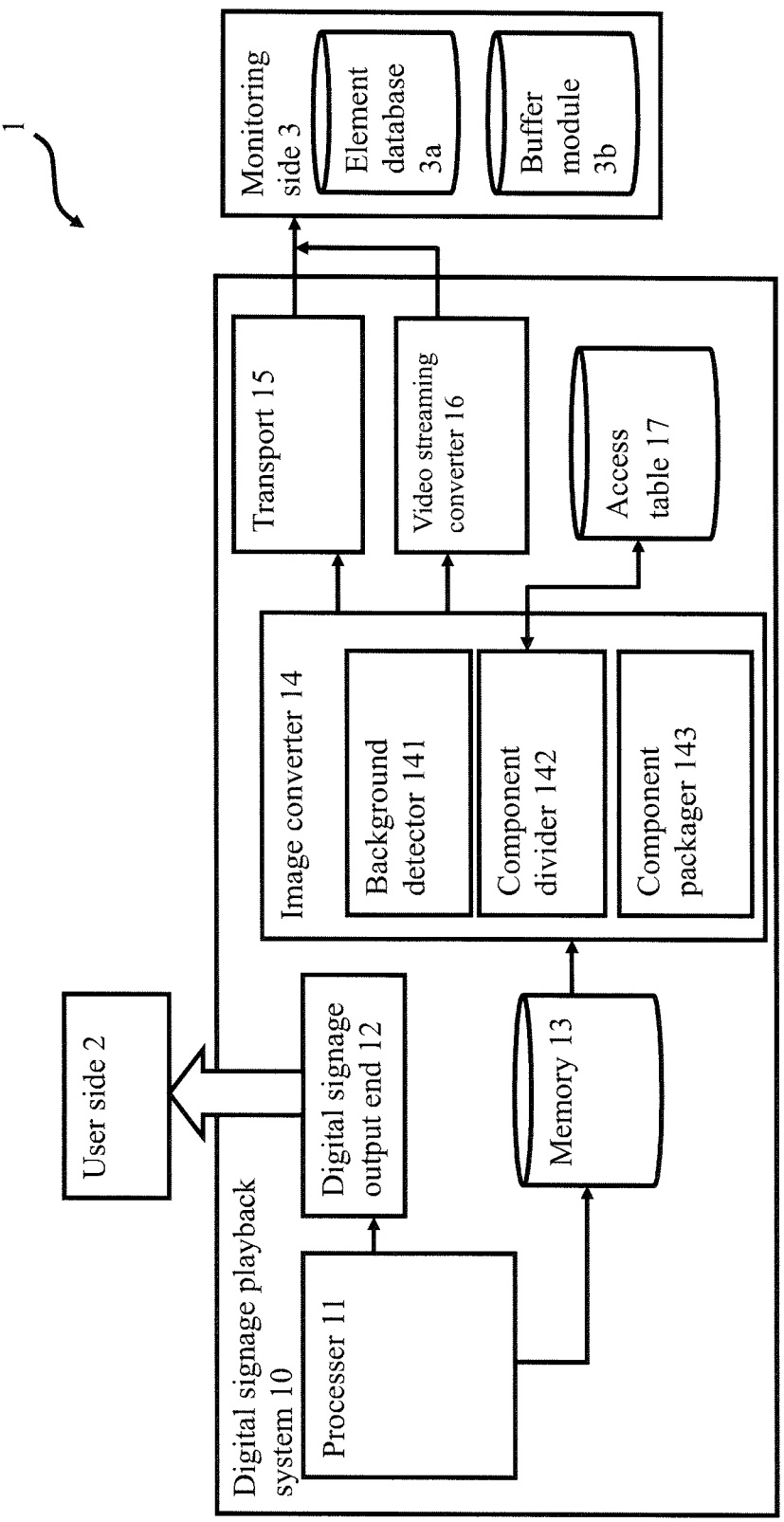
FIG. 1 illustrates a structure schematic drawing of a monitoring system according to the present invention.

Please refer to FIG. 1, which illustrates a structure schematic drawing of a monitoring system according to the present invention.

Figure 2:
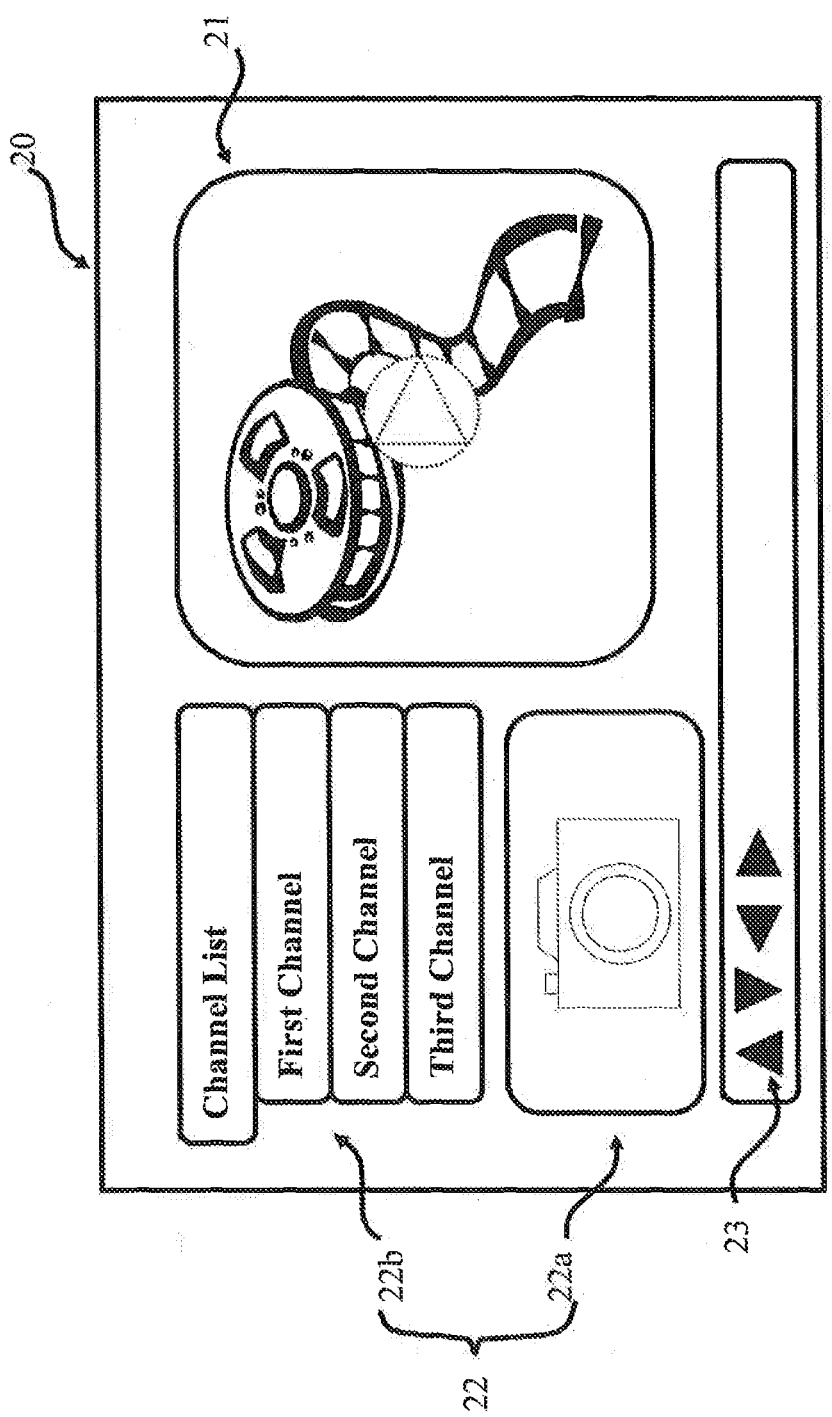
FIG. 2 illustrates a schematic drawing of a digital signage according to the present invention.

The monitoring system 1 comprises a user side 2, a monitoring side 3, and a digital signage playback system 10. The digital signage playback system 10 is used for generating a digital signage 20 (as shown in FIG. 2) for being displayed at the user side 2. Meanwhile, the digital signage 20 can also be returned to the monitoring side 3, such that the monitoring side 3 can monitor the content displayed on the digital signage 20. The monitoring side 3 is not limited to monitoring only a single digital signage 20; please note that the monitoring side 3 can also simultaneously monitor a plurality of different digital signages 20 returned by different digital signage playback systems 10.

The digital signage playback system 10 comprises a processor 11, an output module digital signage output end 12, a memory 13, a conversion module image converter 14, a transport 15, a video streaming conversion module converter 16, and an access table 17. The abovementioned processor 11, the output module digital signage output end 12, the conversion module image converter 14, the transport 15, and the video streaming conversion module converter 16 can all be accomplished by hardware, hardware combined with firmware or hardware combined with software, such as utilizing a microprocessor to compose the abovementioned modules without limiting the scope of the present invention, please note that the architecture capable of achieving the same functions of the present invention can be covered by the scope of the present invention. The processor 11 is equipped with playback content, lay-out and schedule management functions for generating the digital signage 20 according to downloaded files. Please refer to FIG. 2, which illustrates a schematic drawing of a digital signage according to the present invention. The digital signage 20 can be divided into at least one dynamic video file 21, static image file 22, and existing element file 23. The static image file 22 can comprise an image file 22a and a text file 22b; however, please note that the present invention is not limited to comprising all of the abovementioned types of files. The existing element file 23 can comprise, but not limited to, a frame, a button or a banner for composing the digital signage 20. The processor 11 can download an original digital file from, but not limited to, a network or other server side (not shown in figures). The original digital file can also be directly stored in an internal module of the digital signage playback system 10. Because the method of generating the digital signage 20 has been widely applied by those skilled in the art related to the present invention, there is no need for further description.

The output module digital signage output end 12 is electrically connected to the processor 11. When the processor 11 generates the digital signage 20, the processor 11 outputs the digital signage 20 to the user side 2 via the output module digital signage output end 12, such that the user side 2 can display the content of the digital signage 20. The memory 13 is electrically connected to the processor 11. At the time the output module digital signage output end 12 outputs the digital signage 20 to the user side 2, the processor 11 also stores the digital signage 20 into the memory 13.

The conversion module image converter 14 is electrically connected to the memory 13. The conversion module image converter 14 reads the digital signage 20 from the memory 13, so as to analyze the digital signage 20, and further to dividing the digital signage 20 into the dynamic video file 21 and the static image file 22 according to the content, wherein the static image file 22 can be further divided into the image file 22a and the text file 22b for different processes according to different types of files. The conversion module image converter 14 can comprise a background detection module detector 141, a component dividing module divider 142, and a component package module packager 143. The background detection module detector 141 is used for detecting a background color of the digital signage 20 and for removing the background color, such that the file size for being transmitted to the monitoring side 3 can be reduced accordingly. After the background detection module detector 141 removes the background color from the digital signage 20, the component dividing module divider 142 then sorts and analyzes each of the components inherent in the digital signage 20, so as to divide the dynamic video file 21, the image file 22a, and the text file 22b from the digital signage 20. Then, the component package module packager 143 processes the image file 22a and the text file 22b of the static image file 22, so as to utilize a remote desktop protocol (RDP) to compress the image file 22a and the text file 22b, thereby obtaining an compressed image file. However, the present invention is not limited to utilizing the RDP to compress the image file 22a and the text file 22b, please note that wavelet transform compression or mixed raster content (MRC) compression can also be applied for performing the compression.

The transport 15 is electrically connected to the conversion module image converter 14, so as to utilize push technology to transmit the compressed image file to the monitoring side 3. The dynamic video file 21 divided by the component dividing module divider 142 would be directly converted by utilizing the video streaming conversion module converter 16, so as to convert the dynamic video file 21 into a streaming video file for being transmitted to the monitoring side 3. The streaming video file can be in the streaming format of H.264 as a non-limiting example. Because the details of the abovementioned push technology or the method of converting the file into the streaming file are not the key elements of the present invention, and have been widely applied by those skilled in the related art, there is no need for further description. As a result, the monitoring side 3 can receive the downsized compressed image file and the streaming video file, and synchronously display the files for monitoring the digital signage 20, such that the flow of displaying the video at the monitoring side 3 can be reduced.

Further, the conversion module image converter 14 can further divide the existing element file 23 from the digital signage 20. Because the existing element file 23 can comprise elements such as frames, buttons, or banners for composing the digital signage 20, the monitoring side 3 can build an element database 3a in advance for storing parameters which compose the digital signage 20. When the conversion module image converter 14 divides the existing element file 23 from the digital signage 20, it then generates an element code according to the existing element file 23 for being transmitted to the monitoring side 3. In this regard, the monitoring side 3 can query the element database 3a according to the element code to know the existing element file 23. Therefore, the monitoring side 3 can synchronously display the existing element file 23. By transmitting the element code, the network transmission flow can be significantly reduced as well.

The digital signage playback system 10 can also comprise an access table 17. The access table 17 is electrically connected to the conversion module image converter 14. When the component dividing module divider 142 of the conversion module image converter 14 divides the image file 22a and the text file 22b, the image file 22a and the text file 22b are stored in the access table 17. The monitoring side 3 can also comprise a buffer 3b used for storing the previously transmitted image file 22a or text file 22b. Therefore, when the component package module packager 143 needs to generate the compressed image file, it can check whether the same image file 22a or text file 22b has been previously transmitted according to the access table 17. If the same image file 22a or text file 22b has been previously transmitted to the monitoring side 3, the conversion module image converter 14 controls the monitoring side 3 to directly read and display from its buffer 3b without repeatedly transmitting the same files to the monitoring side 3, thereby saving a lot of network transmission flow.

Figure 3A:
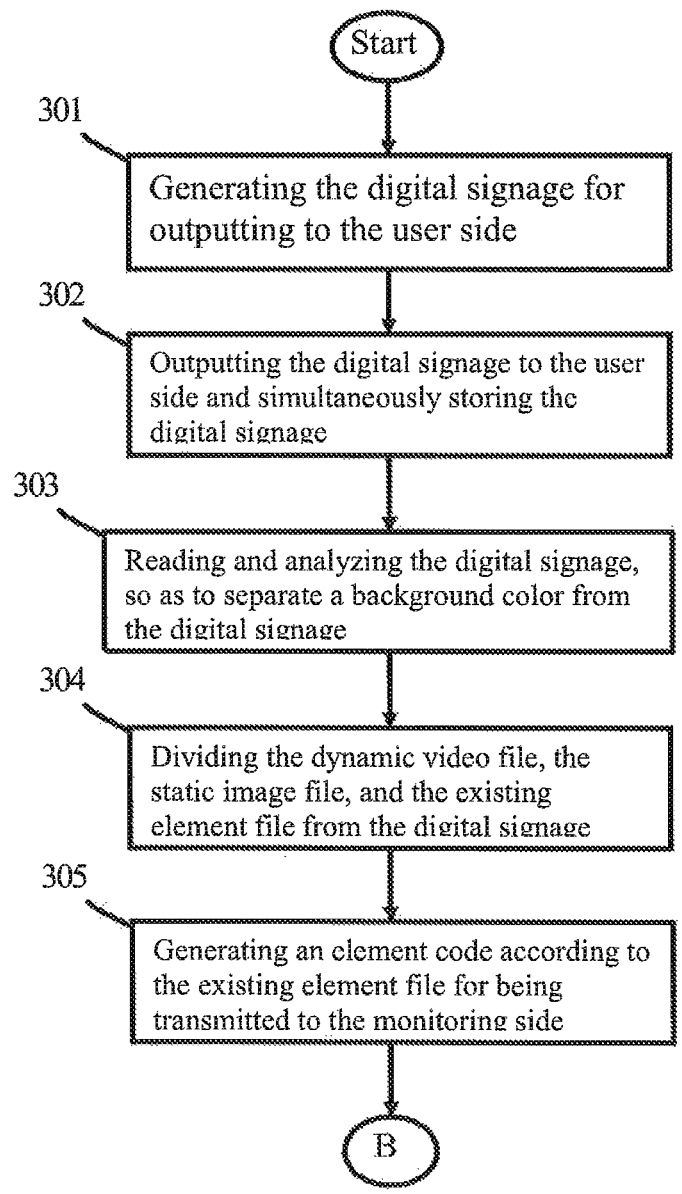
FIGS. 3A-3B illustrate flowcharts of a monitoring method according to the present invention.
Figure 3B:
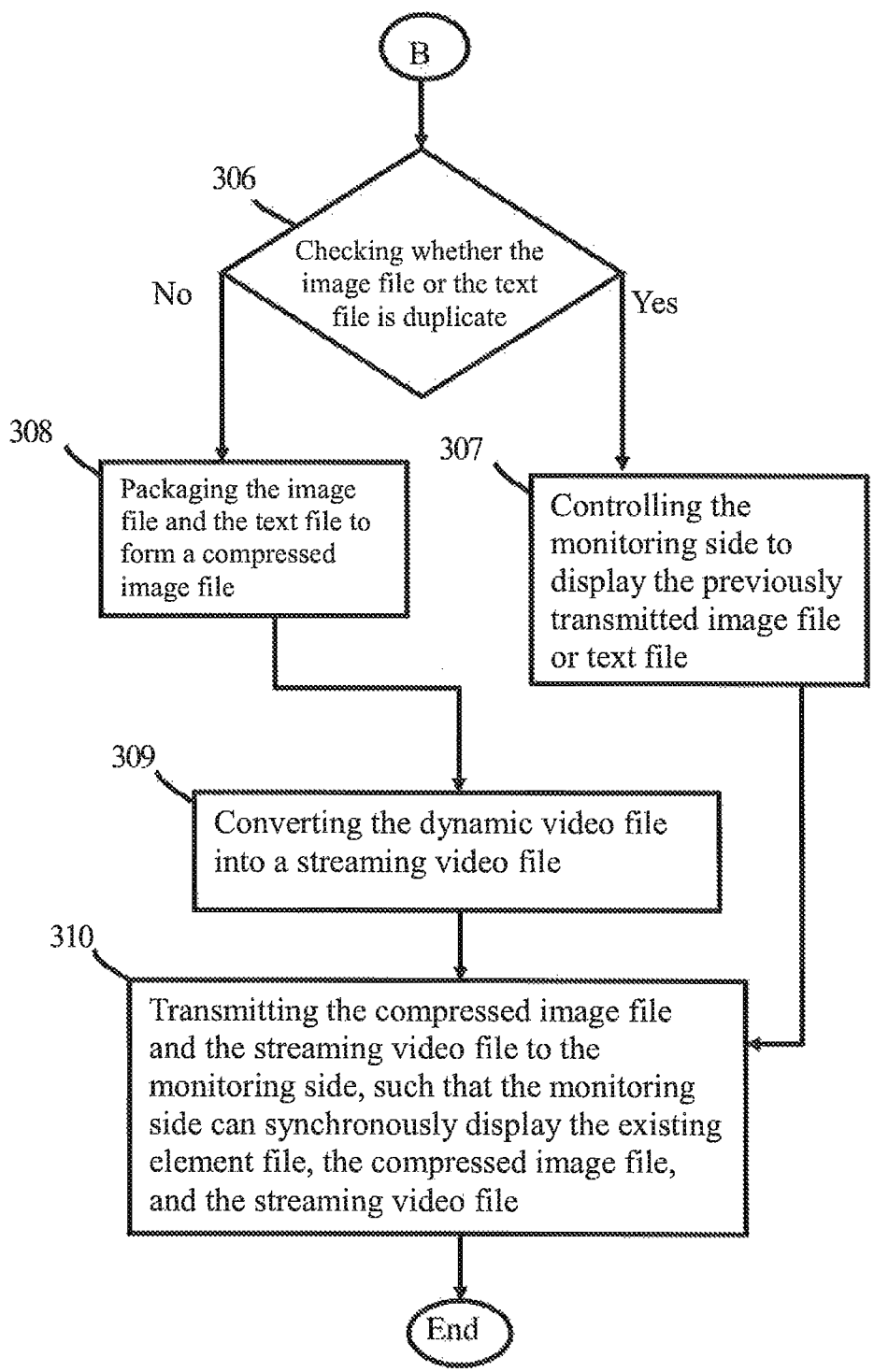

Then, please refer to FIGS. 3A-3B illustrating flowcharts of a monitoring method according to the present invention. Please note that the following embodiment utilizes the monitoring system 1 having the digital signage playback system 10 as an example of describing the monitoring method of the present invention; however, please note that the monitoring method of the present invention is not limited to be implemented in the monitoring system 1.

First, the method performs step 301: generating the digital signage for outputting to the user side.

At first, the processor 11 of the digital signage playback system 10 can download the original digital file from the network or other server side, or read the file from the internal module of the digital signage playback system 10, so as to generate the digital signage 20 for being outputted to the user side 2.

The digital signage 20 can comprise at least one dynamic video file 21, static image file 22, and existing element file 23. The static image file 22 can comprise an image file 22a and a text file 22b. However, please note that the present invention is not limited to comprising all of the abovementioned types of files.

Then, the method performs step 302: outputting the digital signage to the user side and simultaneously storing the digital signage.

Then, after the processor 11 generates the digital signage 20, the digital signage 20 is transmitted to the user side 2, such that the user side 2 can display the digital signage 20. Upon transmitting the digital signage 20, the processor 11 also stores the digital signage 20 into the memory 13 at the same time.

Next, the method performs step 303: reading and analyzing the digital signage, so as to separate a background color from the digital signage.

Next, the conversion module image converter 14 reads the digital signage 20 from the memory 13, and analyzes the digital signage 20. In order to reduce the transmission flow of follow-up procedures, the background detection module detector 141 firstly detects the background color of the digital signage 20, and removes its background color, so as to reduce the flow of the follow-up network transmission.

Then, the method performs step 304: dividing the dynamic video file, the static image file, and the existing element file from the digital signage.

Then, the component dividing module divider 142 divides the dynamic video file 21, the static image file 22, and the existing element file 22 from the digital signage 20, wherein the static image file 22 can be further divided into the image file 22a and the text file 22b. As a result, the component dividing module divider 142 determines that the image file 22a and the text file 22b of the static image file 22 belong to the same classification, whereas the dynamic video file 21 belongs to another classification, and the existing element file 23 belongs to yet another classification, so as to separately execute follow-up processing procedures.

With regard to the existing element file 23, the conversion module image converter 14 firstly executes step 305: generating an element code according to the existing element file for being transmitted to the monitoring side.

When the conversion module image converter 14 divides the existing element file 23 from the digital signage 20, the element code is obtained accordingly, and thus the element code is transmitted to the monitoring side 3.

With regard to the static image file 22, the component dividing module divider 142 firstly executes step 306: checking whether the image file or the text file is duplicate.

When the component dividing module divider 142 divides the image file 22a and the text file 22b from the static image file 22, the component dividing module divider 142 stores the image file 22a and the text file 22b into the access table 17. Meanwhile, the component dividing module divider 142 checks whether the access table 17 has been stored with the same image file 22a or text file 22b.

If step 306 determines any image file 22a or text file 22b is duplicated, the method then performs step 307: controlling the monitoring side to display the previously transmitted image file or text file.

At this time, the conversion module image converter 14 controls the monitoring side 3 to read and display the previously transmitted image file 22a or text file 22b from the buffer 3b without repeatedly transmitting the same image file 22a or text file 22, so as to accordingly save the transmission flow. After step 307, the method directly performs step 310 to let the monitoring side 3 displays the previously transmitted image file 22a or text file 22b.

If the image file 22a and the text file 22b are newly generated contents, the method performs step 308: packaging the image file and the text file to form a compressed image file.

At this time, the component packager 143 performs compression to the image file 22a and the text file 22b of the static image file 22 to form the compressed image file. For example, the method utilizes, but not limited to, RDP to compress the image file 22a and the text file 22b. As a result, the component packager 143 can generate the compressed image file in a smaller size.

As for the dynamic video file 21, the method performs step 309: converting the dynamic video file into a streaming video file.

After the component divider 142 divides the dynamic video file 21 from the digital signage 20, the dynamic video file 21 is transmitted to the video streaming converter 16, such that the video streaming converter 16 can convert the dynamic video file 21 into the streaming video file, so as to reduce the flow of transmitting to the monitoring side 3.

Finally, the method performs step 310: transmitting the compressed image file and the streaming video file to the monitoring side, such that the monitoring side can synchronously display the existing element file, the compressed image file, and the streaming video file.

Finally, the transport 15 utilizes the push technology to transmit the compressed image file to the monitoring side 3 for playback; meanwhile, the video streaming converter 16 transmits the streaming video file into the monitoring side 3. Also, the element code would be transmitted to the monitoring side 3, such that the monitoring side 3 can query the element database 3a according to the element code to know the existing element file 23. Therefore, when the monitoring side 3 displays the digital signage 20 at the user side 2, the monitoring side 3 can synchronously display the compressed image file, the streaming video file, and the existing element file 23, which is equivalent to synchronously monitoring the playback content of the digital signage 20 in real time.

Please note that the monitoring method of the present invention is not limited to the above step orders and sequences, the step orders and sequences can be exchanged as long as the object of the present invention can be achieved.

According to the monitoring system 1 and its monitoring method of the present invention, the monitoring side 3 can be aware of the playback content of the digital signage 20, and can more effectively transmit data as well as significantly reduce the network flow without occupying too much network bandwidth.

Although the present invention has been explained in relation to its preferred embodiments, it is to be understood that many other possible modifications and variations can be made without departing from the spirit and scope of the invention as hereinafter claimed.

What is claimed is:

1. A digital signage playback system used for providing a digital signage to display at a user side, and allowing a monitoring side to monitor the digital signage, wherein the digital signage comprises a dynamic video file and a static image file, the digital signage playback system comprising:
   a processor, used for generating the digital signage;
   a digital signage output end, electrically connected to the processor, used for outputting the digital signage to the user side;
   a memory, electrically connected to the processor, wherein when the digital signage output end outputs the digital signage to the user side, the processor stores the digital signage into the memory at the same time;
   an image converter, electrically connected to the memory, used for reading from the memory and analyzing the digital signage, so as to convert the static image file into an compressed image file; wherein the digital signage further comprises an existing element file, the monitoring side comprises an element database, and the image converter further divides the existing element file from the digital signage, so as to generate an element code according to the existing element file for being transmitted to the monitoring side, such that the monitoring side can query the element database according to the element code, and thereby synchronously displaying the existing element file;
   a transport, electrically connected to the image converter, used for transmitting the compressed image file to the monitoring side; and
   a video streaming converter, electrically connected to the image converter, used for converting the dynamic video file into a streaming video file for being transmitted to the monitoring side, such that the monitoring side can synchronously display the compressed image file and the streaming video file.

2. The digital signage playback system as claimed in claim 1, wherein the static image file comprises an image file and a text file, and the image converter further comprises:
   a background detector, used for separating a background color from the digital signage upon reading the digital signage;
   a component divider, used for dividing the dynamic video file, the image file, and the text file from the digital signage; and
   a component packager, used for packaging the image file and the text file to form the compressed image file.

3. The digital signage playback system as claimed in claim 2 further comprising an access table, wherein after the component divider divides the image file and the text file for being stored in the access table, the image converter checks whether the image file or the text file is duplicate according to the access table; if yes, the image converter controls the monitoring side to display the previously transmitted image file or text file.

4. The digital signage playback system as claimed in claim 3, wherein the monitoring side has a buffer, used for storing the previously transmitted image file or text file, and the image converter controls the monitoring side to read from the buffer so as to display the previously transmitted image file or text file.

5. The digital signage playback system as claimed in claim 2, wherein the component packager obtains the compressed image file by executing a remote desktop protocol (RDP).

6. The digital signage playback system as claimed in claim 1, wherein the existing element file comprises a frame, a button, or a banner.

7. A monitoring system, comprising:
   a user side;
   a monitoring side; and
   a digital signage playback system, connected to both the user side and the monitoring side, used for providing a digital signage to display at the user side, and allowing the monitoring side to monitor the digital signage; wherein the digital signage comprises a dynamic video file and a static image file, the digital signage playback system comprising:
- a processor, used for generating the digital signage;
- a digital signage output end, electrically connected to the processor, used for outputting the digital signage to the user side;
- a memory, electrically connected to the processor, wherein when the digital signage output end outputs the digital signage to the user side, the processor stores the digital signage into the memory at the same time;
- an image converter, electrically connected to the memory, used for reading from the memory and analyzing the digital signage, so as to convert the static image file into an compressed image file; wherein the digital signage further comprises an existing element file, the monitoring side comprises an element database, and the image converter further divides the existing element file from the digital signage, so as to generate an element code according to the existing element file for being transmitted to the monitoring side, such that the monitoring side can query the element database according to the element code, and thereby synchronously displaying the existing element file;
- a transport, electrically connected to the conversion module, used for transmitting the compressed image file to the monitoring side; and
- a video streaming converter, electrically connected to the image converter, used for converting the dynamic video file into a streaming video file for being transmitted to the monitoring side, such that the monitoring side can synchronously display the compressed image file and the streaming video file.

8. The monitoring system as claimed in claim 7, wherein the static image file comprises an image file and a text file, and the image converter further comprises:
- a background detector, used for separating a background color from the digital signage upon reading the digital signage;
- a component divider, used for dividing the dynamic video file, the image file, and the text file from the digital signage; and
- a component packager, used for packaging the image file and the text file to form the compressed image file.

9. The monitoring system as claimed in claim 8, further comprising an access table, wherein after the component divider divides the image file and the text file for being stored in the access table, the image converter checks whether the image file or the text file is duplicate according to the access table; if yes, the image converter controls the monitoring side to display the previously transmitted image file or text file.

10. The monitoring system as claimed in claim 9, wherein the monitoring side has a buffer, used for storing the previously transmitted image file or text file, and the image converter controls the monitoring side to read from the buffer so as to display the previously transmitted image file or text file.

11. The monitoring system as claimed in claim 10, wherein the component packager obtains the compressed image file by executing a remote desktop protocol (RDP).

12. The monitoring system as claimed in claim 7, wherein the existing element file comprises a frame, a button or a banner.

13. A monitoring method, used for allowing a monitoring side of a monitoring system to monitor a digital signage of a digital signage playback system displayed at a user side, wherein the digital signage comprises a dynamic video file and a static image file, the monitoring method comprising the following steps:
- generating the digital signage for outputting to the user side;
- outputting the digital signage to the user side and storing the digital signage;
- reading and analyzing the digital signage;
- converting the static image file into a compressed image file;
- converting the dynamic video file into a streaming video file; and
- transmitting the compressed image file and the streaming video file to the monitoring side, such that the monitoring side displays the compressed image file and the streaming video file; wherein the digital signage further comprises an existing element file, the monitoring side comprises an element database, and the step of analyzing the digital signage further comprises the following steps:
- dividing the existing element file from the digital signage;
- generating an element code according to the existing element file for being transmitted to the monitoring side; and
- controlling the monitoring side to query the element database according to the element code, and thereby synchronously displaying the existing element file.

14. The real-time monitoring method as claimed in claim 13, wherein the static image file comprises an image file and a text file, and the step of analyzing the digital signage further comprises the following steps:
- separating a background color from the digital signage;
- dividing the dynamic video file, the image file, and the text file from the digital signage; and
- packaging the image file and the text file to form the compressed image file.

15. The monitoring method as claimed in claim 14, wherein the step of analyzing the digital signage further comprises the following steps:
- storing the image file and the text file;
- checking whether the stored image file or the text file is duplicate; and
- if yes, controlling the monitoring side to display the previously transmitted image file or text file.

16. The monitoring method as claimed in claim 14 further comprising the following step:
- obtaining the compressed image file by executing a remote desktop protocol (RDP).

17. The monitoring method as claimed in claim 15 further comprising the following step:
- utilizing a push mechanism to transmit the compressed image file to the monitoring side.

* * * * *